United States Patent
Plissonneau et al.

(10) Patent No.: US 6,934,333 B1
(45) Date of Patent: Aug. 23, 2005

(54) PROCESS AND DEVICE FOR CODING IMAGES ACCORDING TO THE MPEG STANDARD FOR THE INSETTING OF IMAGETTES

(75) Inventors: Frédéric Plissonneau, Thorigné Fouillard (FR); Jean-Yves Aubie, Melesse (FR); Pierre Ruellou, Domloup (FR); Alain Sorin, Cesson-Sévigné (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/856,844

(22) PCT Filed: Nov. 11, 1999

(86) PCT No.: PCT/EP99/09025

§ 371 (c)(1),
(2), (4) Date: May 25, 2001

(87) PCT Pub. No.: WO00/31979

PCT Pub. Date: Jun. 2, 2000

(30) Foreign Application Priority Data

Nov. 25, 1998  (FR) .............................................. 98 14851

(51) Int. Cl.$^7$ ................................................. H04N 1/66
(52) U.S. Cl. ................................................. 375/240.16
(58) Field of Search .......................... 375/240.16, 240, 375/240.01, 240.03, 240.04, 240.05, 240.09, 240.11, 240.13, 240.15, 240.23, 240.14, 240.17; 348/607; H04B 1/66

(56) References Cited

U.S. PATENT DOCUMENTS

| | | | | |
|---|---|---|---|---|
| 5,587,741 A | * | 12/1996 | Kim | 375/240.17 |
| 5,598,226 A | * | 1/1997 | Kokaram | 348/607 |
| 5,959,672 A | * | 9/1999 | Sasaki | 375/240.23 |
| 6,084,908 A | * | 7/2000 | Chiang et al. | 375/240.03 |
| 6,208,693 B1 | * | 3/2001 | Chen et al. | 375/240.24 |

FOREIGN PATENT DOCUMENTS

EP          650 298 A1     4/1995     ............ H04N/7/13

* cited by examiner

*Primary Examiner*—Tung Vo
(74) *Attorney, Agent, or Firm*—Joseph S. Tripoli; Ronald H. Kurdyla; Guy H. Eriksen

(57) ABSTRACT

The process utilizing the inter mode with motion estimation with respect to a reference image and the intra mode, wherein: an exclusion zone which includes the macroblocks which lie even partially in the location of the imagette is defined in the image, the motion estimation of the macroblocks of the image not belonging to the exclusion zone cannot take account of an image block belonging to the exclusion zone in the reference image. Applications relate to the coding of images which is compatible with the inserting of logos or other imagettes specific to the utilizer. They also relate to the real-time coding of images comprising insets.

9 Claims, 2 Drawing Sheets

PROCESS AND DEVICE FOR CODING IMAGES ACCORDING TO THE MPEG STANDARD FOR THE INSETTING OF IMAGETTES

This application claims the benefit under 35 U.S.C. § 365 of International Application PCT/EP99/09025, filed Nov. 11, 1999, which was published in accordance with PCT Article 21 (2) on Jun. 2, 2000 in English, and which claims the benefit of French Application No. 98/14851, filed Nov. 25, 1998.

BACKGROUND OF THE INVENTION

1. Field of the Invention

The invention relates to an image coding process for the insetting of an imagette into an image coded according to the MPEG standard.

2. Description of Prior Art

Until the last few years, the images produced were generally transmitted and exchanged between television signal broadcasting operators in uncompressed form, that is to say in clear.

When it was necessary to adapt a source programme, the processing of the images was carried out on the basis of professional hardware. For example, when a director needed to utilize a report from a concurrent channel, he could readily, with the aid of a mixer, insert his own logo, information such as subtitles, the score of a match, etc. without additional equipment.

Now that the broadcasting and exchanging of data are performed in the form of compressed data, for example according to the MPEG standard, the insetting techniques require additional hardware: a decoder for bringing the compressed images into baseband at the input of the mixer, a coder for re-encoding the sequences after they have been modified. Moreover, to perform a re-encoding of better quality, it may be necessary to implement a decoder/coder pair which is aware of how to manage assistance information which is added to the coded signal and passes through all the studio equipment before reaching the re-encoder, thereby making the system complex.

SUMMARY OF THE INVENTION

The purpose of the invention is to alleviate the aforesaid drawbacks.

Its subject is a process for coding images according to the MPEG standard, for the insetting of at least one imagette into an image, utilizing the inter mode with motion estimation with respect to a reference image and the intra mode, characterized in that:
  an exclusion zone which includes the macroblocks which lie even partially in the location of the imagette is defined in the image,
  the motion estimation of the macroblocks of the image not belonging to the exclusion zone cannot take account of an image block belonging to the exclusion zone in the reference image.

According to a particular mode of implementation, the inter mode for the coding of the macroblocks of the image belonging to an exclusion zone is an inter mode with null motion vectors.

According to a particular mode of implementation, the intra mode is forced for the coding of the macroblocks of the image belonging to an exclusion zone.

According to a particular mode of implementation, it carries out a marking of the macroblocks of the reference image belonging to the exclusion zone.

According to a particular mode of implementation, the marking consists in performing a transcoding of the luminance values of the macroblocks by decrementing the values equal to the maximum coding value and then by forcing the luminance values of the macroblocks belonging to the exclusion zone to this maximum value.

According to a particular mode of implementation, for a given row of macroblocks, the coding allocates a specific slice for the macroblocks belonging to an exclusion zone.

The invention also relates to a process for inserting an imagette into an image coded according to the process described above, characterized in that the macroblocks of an intra-coded slice are replaced by macroblocks relating to the imagette.

According to a particular mode of implementation, the replacement consists of a recovery of the intra-coded macroblocks corresponding to the exclusion zones, a baseband decoding of these macroblocks, a mixing with the imagette to be inset into the exclusion zone, a coding of the image obtained so as to provide the replacement macroblocks.

According to a particular mode of implementation, the quantization interval for the coding of the macroblocks belonging to the exclusion zone is a function of the cost coding the macroblocks to be inserted.

The invention also relates to a device for coding digital video data according to the MPEG standard for the insetting of at least one imagette into an image, comprising a subtractor receiving on a first input an intra macroblock and on a second input a predicted macroblock to be subtracted from the intra macroblock so as to provide an inter macroblock, a circuit for selecting an inter or intra mode receiving the corresponding intra macroblock or inter macroblock for selecting one of the macroblocks according to an energy criterion, a circuit for transforming and quantizing the macroblock selected so as to provide a macroblock of quantized coefficients, a circuit for the variable-length coding of the macroblock of quantized coefficients and a buffer memory for providing a data stream at the output of the coding device, an inverse quantization and inverse transformation circuit for obtaining a macroblock reconstituted from the macroblock of quantized coefficients, an adder of the reconstituted macroblock to the predicted macroblock so as to provide a reconstructed macroblock, a memory and predictor for storing the reconstructed macroblock and providing a reconstructed image, a motion estimator receiving the intra macroblock and the reconstructed macroblocks so as to provide a motion vector (MV) for the memory and predictor so as to calculate the predicted block, a regulating circuit receiving information from the buffer memory so as to set a quantization interval for the transform and quantization circuit, characterized in that:
  the selection circuit and the motion estimation circuit receive an information item pertaining to an exclusion zone (ZE) which includes the macroblocks lying, even partially, in the location of the imagette,
  the selection circuit forces the intra-coding of the macroblocks belonging to this exclusion zone,
  the motion estimation circuit calculates the motion vectors while eliminating the motion vectors pointing from the blocks of the reconstructed image belonging to the exclusion zone.

According to a particular embodiment, the device is characterized in that the regulating circuit receives the information item defining an exclusion zone so as to adapt the quantization interval of the transform and quantization circuit for the macroblocks in this exclusion zone.

The principle of the invention consists in defining exclusion zones in the image, the coding of the image not belonging to the zones being performed independently of these zones, a motion vector pointing at an exclusion zone not being, as the case may be, taken into account. The insetting of an imagette into an image sequence can be carried out in a simple manner while limiting the decoding of the image to a predetermined zone.

The main advantage of the invention is that it avoids the use of complex and expensive equipment, namely professional decoders and coders. This is all the more true since the formats used, such as the high-definition television format or HDTV, require the utilization of complex equipment.

The decoding and coding of the image are either simply eliminated if the insertion is carried out at the level of the MPEG data stream, or limited to zones of the image which are coded in intra mode when working in baseband, allowing decoding and recoding of these zones by software not requiring any motion estimator and other complex decoding circuits.

Other characteristics and advantages of the present invention will become more apparent from the following description given by way of example and with reference to the appended figures, in which.

In image coding systems with motion compensation such as the systems complying with the MPEG standard, the search for a motion vector in respect of a given image block is carried out with respect to a reference image previously processed and transmitted to the decoder.

Figure 1:
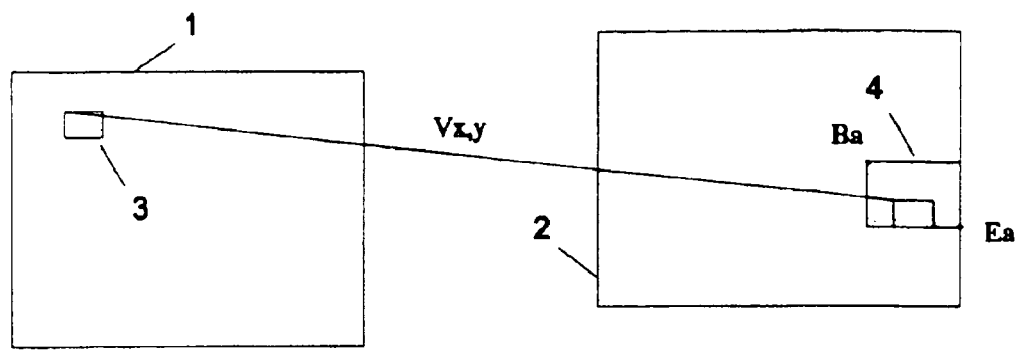
FIG. 1 represents an exclusion zone in a reference image.

FIG. 1 shows a first image 1, called the source image, and a second image 2, called the reference image, from which the source image is coded. The coding of an image block 3 of the source image is performed by carrying out a correlation of this block with blocks of the same dimension which are contained in a search window in the reference image so as to determine a reference block which gives the best correlation. The coding then corresponds to a block of residuals. This block is obtained by luminance and chrominance differencing between the block of the source image and the reference block so as to provide a difference block, then by discrete cosine transformation of this difference block so as to provide a block of coefficients which is the block of residuals. The reference block is defined by a motion vector representing the displacement of the current block with respect to this reference block. The components of the motion vector are transmitted, together with the compressed data, in the MPEG data stream.

The size of the source images and of the reference images being identical, a vector can point towards any zone contained in the reference image.

The coding process according to the invention utilizes a motion estimation excluding the motion vectors pointing into one or more zones declared prohibited and corresponding to the imagettes to be inset or mixed.

More precisely, the imagette which is intended to be inserted into the image and which may be of any dimension, defines a location in the image. The zone declared prohibited or exclusion zone has macroblock resolution, that is to say it corresponds not only to the collection of macroblocks of the image lying wholly within this location but also to the macroblocks encroaching on this location.

An exclusion zone (ZE) or prohibited zone 4 is represented in the reference image 2. This zone is defined for example on the basis of the coordinates of the points Ba and Ea which lie respectively at the top left and at the bottom right of the zone, that is to say at the start of the zone and at the end of the zone when considering television scanning. These coordinates are the numbers of the macroblocks enclosing these points or row numbers and macroblock numbers within the row. This zone can also be defined by the numbers of the macroblocks constituting the zone.

A motion vector Vx,y is calculated on the basis of the previously mentioned correlation step. It designates, in our example, a block lying in the prohibited zone. According to the process of the invention, this block is not adopted for the coding of the block 3.

Figure 2:
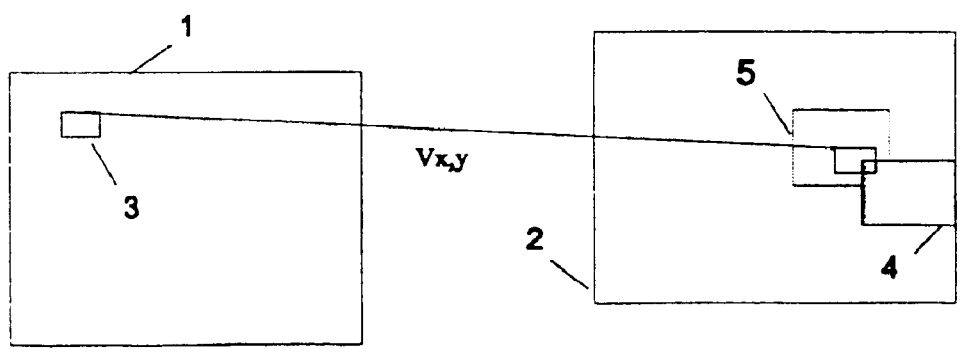
FIG. 2 represents a prohibited position of a predicted macroblock in the search window of the reference image.

In FIG. 2, the same references are used to designate the elements which are common to FIG. 1. In this example, the search window 5 inside which a search is made for the block best correlated with the current block 3 is represented shaded. The block defined on the basis of the motion vector Vx,y encroaches on the exclusion zone 4 and this motion vector is also not adopted.

The motion vector adopted will be the one which gives the best correlation and does not designate a block encroaching into the prohibited zone. The blocks designated in the search window and which contain points belonging to the exclusion zone are therefore excluded from the final choice in respect of a given macroblock. If all the possible positions in the search window encroach on the exclusion zone, then the motion vector, for the relevant macroblock, is forced to zero.

Figure 3:
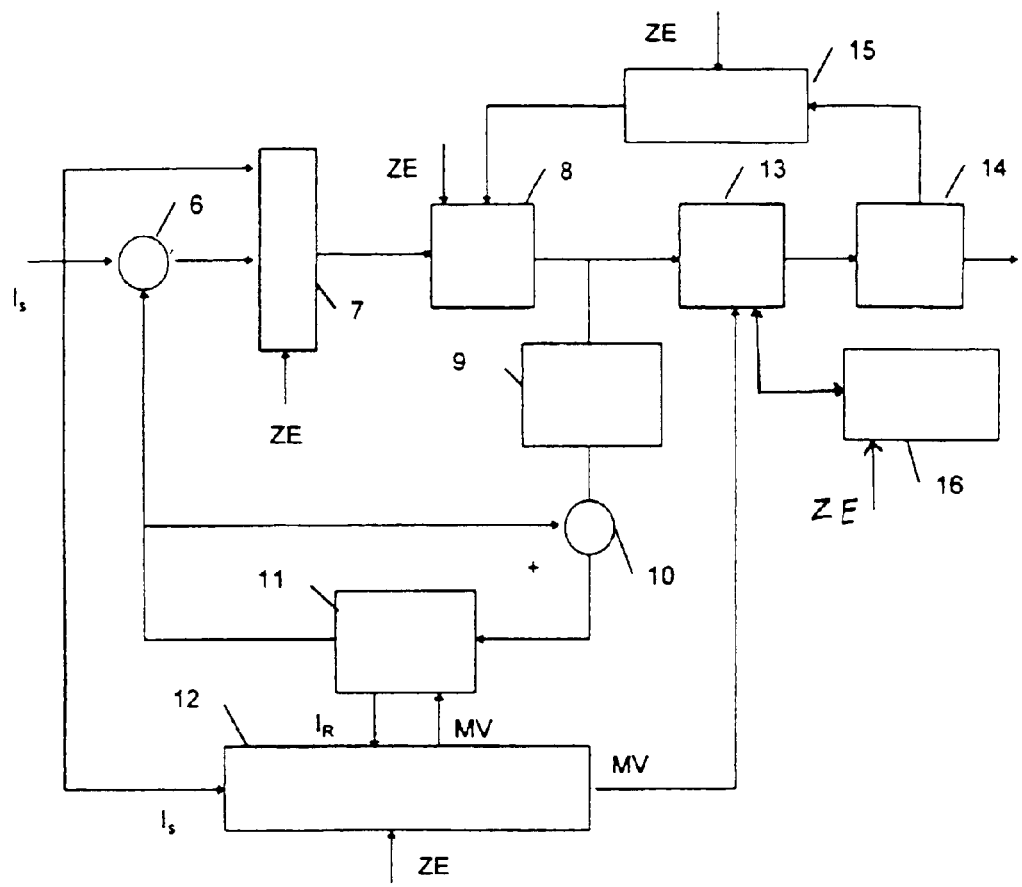
FIG. 3 represents a coding device according to the invention.

This is the process which is utilized by the motion estimator involved in the make-up of the global coding device. Let us give below a description of this coding device represented in FIG. 3.

The source images of the image sequence, after digital coding, reordering and chopping into macroblocks according to the MPEG standard, are transmitted to the input $I_s$ of the device, macroblock by macroblock. This input is connected in parallel to a first input of a subtractor 6, to a first input of an inter/intra mode selector 7 and to a first input of a motion estimator 12. The output of the subtractor is connected to the second input of the mode selector 7. The output of the selector is connected to a first input of a coding circuit 8 which carries out a discrete cosine transformation of the macroblocks received and a quantization of the macroblocks of coefficients obtained. These macroblocks are transmitted to a variable-length coding circuit 13 and then to a buffer memory 14, one output of which is the output of the device delivering the coded data in the form of a data stream. The variable-length coding circuit 13 exchanges data with a syntax generator 16 for configuring the data stream transmitted. It also receives the motion information originating from the motion estimator 12. A second output of the buffer memory 14 is connected to a regulating circuit 15 which transmits information to the coding circuit 8 on a second input.

The coded macroblock exiting the coding circuit 8 is also transmitted to a decoding circuit 9 carrying out the operations inverse to those of the coding circuit 8. The macroblock thus reconstituted is transmitted to a first input of an adder 10. The output of the adder is connected to a first input of a memory and prediction circuit 11 which supplies a predicted macroblock on an output. This macroblock is transmitted to the second input of the subtractor 6 and to the second input of the adder 10.

On a second input, the motion estimator 12 receives the macroblocks of the reconstructed image originating from a second output of the memory and prediction circuit 11. In return it supplies motion information to this circuit.

The selection circuit 7, regulating circuit 15, motion estimation circuit 12 and syntax generation circuit 16 receive, on the other hand, information relating to the exclusion zones in the image.

A current macroblock of the source image is received on the input of the device. This macroblock, called an intra macroblock in this form, is transmitted to the first input of the subtractor 6. The latter subtracts a predicted macroblock from this intra macroblock so as to supply a difference macroblock, also called an inter macroblock. On the first input, the inter/intra selector receives the intra macroblock and, on the second input, it receives the inter macroblock and selects one of these macroblocks as a function of energy criteria, for example their coding cost. If the inter macroblock is selected, then an inter coding mode is involved, if the intra macroblock is selected, then an intra coding mode is involved. The macroblock selected is thereafter transformed by a discrete cosine transformation so as to give a block of coefficients and is then quantized as a function of a quantization interval calculated by the regulating circuit 15. The macroblock of quantized coefficients is coded according to a variable-length coding by the variable-length coder 13 also called a VLC coder. Appended to the data received by this coder 13 is the information transmitted by the syntax generator 16 so as to make it possible to generate, from these data, a stream of data according to the syntax relating to the MPEG standard. These data are thereafter transmitted to the buffer memory 14 whose fill level is supplied to the regulating circuit 15 which controls the quantization interval for the coefficients of the macroblocks accordingly so as to regulate the bit rate.

The macroblock of quantized coefficients is transmitted to the decoding circuit 9 so as to supply a reconstructed macroblock to the memory and prediction circuit 11, after adjoining the corresponding predicted macroblock. The storing of these macroblocks provides a reconstructed image. The reconstructed macroblocks are transmitted to the motion estimator 12 for the calculation of motion vectors (MV) relating to the current macroblock of the source image, as explained later with regard to FIG. 4. The motion vectors received by the memory and prediction circuit make it possible to define the macroblock, in the reconstructed image, which is used as predicted macroblock for the coding of the current macroblock.

The syntax generation circuit 16, the selection circuit 7, the regulating circuit 15 and the motion estimation circuit 12 receive the information (ZE) relating to the exclusion zones which are the image zones in which it is desired to insert or mix additional information, for example a logo, a digit, a subtitle, etc.

The MPEG coding requires that the image be chopped into slices, a slice being a continuous series of macroblocks all forming part of the same horizontal row of macroblocks, according to the MPEG definition. A slice is therefore composed of 16 video lines.

A slice is preceded by a header readily identified by a decoder. In the "50 Hz" standard television format, the 576 useful lines are distributed into 36 slices, a slice then corresponding to a row and stretching over the width of the image. The standard also makes it possible to perform finer chopping by defining several slices in the same row, that is to say over one image width.

It is this possibility which is utilized for the coding of the lines of which a part belongs to the exclusion zone. Thus the relevant macroblocks are grouped together into specific slices for which a bit belonging to the header flags the fact that they are all coded in intra mode. Thus, for a given row, the syntax generation circuit generates a slice header for the first macroblock belonging to an exclusion zone. Likewise for the first macroblock no longer belonging to the exclusion zone. The number of slices generated for a given row is thus dependent on the number of exclusion zones in this row.

The act of passing from one slice to another on entering an exclusion zone makes it possible to isolate oneself from the previous slice. Although a macroblock is coded in intra mode, the DC coefficient of this macroblock calls upon the DC coefficient of the previous macroblock in the same slice. The coding of this macroblock is thus dependent on the previous macroblock except for the first macroblock of each slice. Changing slice thus makes it possible to isolate oneself completely from the current surrounding image for the coding of the exclusion zone. This is necessary when decoding the exclusion zone since one chooses to decode this zone only, and when inserting the macroblocks corresponding to the imagette into the exclusion zone, which macroblocks should not call upon information outside this zone.

The exclusion zones of an image are translated, by a processing circuit (not represented in the figure), into row numbers and macroblock numbers within the row (or numbers of the macroblocks in the image) as indicated earlier. This information ZE is transmitted to the inter/intra mode selection circuit 7 which counts the rows and the macroblocks processed in the row (or the macroblocks processed in the image) and forces the coding in intra mode when the current macroblock received corresponds to a macroblock of the exclusion zone. This information is also transmitted to the syntax generation circuit which triggers the generation of a new slice in the VLC coding circuit for each macroblock group belonging to an exclusion zone, doing so for each row. This information is also transmitted to the regulating circuit 15. Thus, this circuit can force the quantization interval used by the quantizer 8 to a value below that calculated by the regulating circuit as a function of the filling of the buffer memory so as to improve the resolution of the exclusion zone. This makes it possible, when the imagettes to be substituted are of more expensive coding than that of an exclusion zone of the original image, to artificially increase the cost of coding this exclusion zone, facilitating the substitution of the macroblocks in the data stream. Another solution would consist in reducing the resolution of the imagettes so that their coding cost is not greater than that of the exclusion zones of the original image. This information is finally transmitted to the motion estimator so as to prevent it from choosing motion vectors which point into an exclusion zone according to the device made explicit in FIG. 4.

The various circuits receiving the macroblock numbers and row numbers relating to the exclusion zones are equipped with counters for identifying the macroblock processed.

The above description relates to the coding of a sequence of images so as to make it compatible with the insertion of imagettes into predefined zones. It is thus possible, for any user of these data, to extract the data relating to the exclusion zones, this involving the macroblocks belonging to a slice and which are intra-coded, and to mix these data with user-specific data. If a simple insertion rather than a mixing is involved, the specific data replace the data relating to the exclusion zones.

By virtue of the previously described coding device, it is possible to produce data streams (coded image sequences) in which the macroblocks belonging to the exclusion zone are coded solely in intra mode and are grouped together in particular slices called "intra slices".

In fact, each image undergoes a standard MPEG2 coding processing, except for the exclusion zone. This particular shaping is absolutely transparent to a decoder, for example of the mass market type, which is content to receive, decode and display the images.

On the other hand, when the existence of an exclusion zone is known in a compressed sequence, it is possible to perform the decoding, mixing/insetting and re-encoding processing operations solely on the relevant zone. This can be performed with the aid of a PC-type (Personal Computer) computing machine, that is to say by purely software processing, since the decoding, mixing/insetting and re-encoding are limited to the exclusion zone which is always of small dimension and coded solely with information belonging to the current image; there is no prediction or motion compensation to be calculated.

A slightly modified form of the coding device can be used, if the specific data to be inserted into the images are known a priori.

In this case, the syntax generation circuit 16 possesses a memory or receives from outside the specific data to be inserted, in the form of macroblocks constituting imagettes coded in intra mode. This circuit carries out a substitution, in the VLC coding circuit, of the macroblocks corresponding to the intra coding of the exclusion zones with the macroblocks coding the imagettes. It is thus possible to supply a data stream directly with the insertion of imagettes or logos.

The coding of the imagettes in the form of macroblocks of quantized coefficients can be carried out readily, when no longer working in real time, based on software processing (part of the algorithm of the MPEG coding) of the imagettes in baseband, coded in digital.

Figure 4:
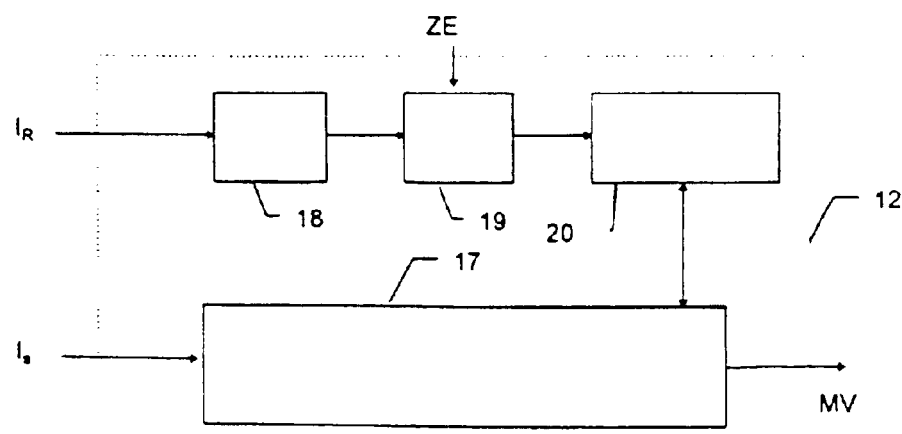
FIG. 4 represents a motion estimator used by the coding device according to the invention.

FIG. 4 represents a motion estimation device used in the previously described coding device.

A macroblock of a current image to be coded or a source image is received on a first input of the motion estimation device 12. It is transmitted to the input of a circuit for calculating the motion vectors 17. The macroblocks of the reference image are received on a second input of the motion estimator 12 and are transmitted to the input of a transcoding circuit 18. This circuit transmits the transcoded luminance values of the macroblocks to a marking circuit 19 for marking the macroblocks belonging to an exclusion zone. The information relating to the exclusion zones (ZE) is received on a third input of the motion estimator 12 which transmits it to a second input of the marking circuit 19. This marking circuit is connected to a memory 20. The circuit for calculating the motion vectors is also connected to the memory 20. At its output, which is also the output of the motion estimator, it supplies the motion vectors (MV) corresponding to each macroblock of the source image.

The macroblocks of the source image are received by the circuit for calculating the motion vectors 17. These are the macroblocks transmitted as input to the coding device of FIG. 3. The macroblocks of the reference image are the macroblocks reconstructed and transmitted by the memory and prediction circuit 11.

The values of the points or pixels processed by the motion estimator are normally represented on eight bits, i.e. a coding of the luminance values between 0 and 255. The macroblocks of the reference image are transmitted to a transcoding circuit 18 which pulls the coding of the luminance values to between 0 and 254, for example by coding the value 255 by the value 254. This does not impair the quality of the estimation, especially since 255 is a value which is rarely achieved in reference images.

The luminance values thus transcoded are transmitted to a marking circuit 19. This circuit also receives the information relating to the exclusion zone (ZE) for the current processed image.

This information is for example the slice number and numbers of the macroblock in this slice, these numbers corresponding to the upper left corner of the exclusion zone and the numbers of the slice and of the macroblock lying in the lower right corner. The dimensions of the exclusion zone or zones are defined a priori and once per image on the basis of these pairs of numbers. This zone can be positioned anywhere in the image and can take all or part of the size of the reference images.

The macroblocks received by the marking circuit are counted for each row and those belonging to the exclusion zone are forced to 255. In fact, only the luminance blocks constituting a macroblock are relevant, the motion estimation taking no account of the chrominance blocks. The luminance value of all the pixels constituting these blocks, i.e. 8×8 values for each of the four luminance blocks, is forced to 255. The luminance values thus coded are transmitted to a reference image memory 20 which stores the luminance values thus coded for each image. The information item relating to the exclusion zone is thus carried by these luminance values. This is then referred to as the marking of the exclusion zone or zones.

For each source image macroblock received on the other input of the motion estimator, the circuit for calculating the motion vectors will search, in this image memory 20 or more exactly in a search window of this image, for the luminance blocks best correlated with the luminance blocks of this macroblock, as indicated previously.

If the correlation calculations determine a marked luminance block, this block is ignored. The unmarked block giving the best correlation is chosen. If all the blocks of the search window belong to the exclusion zone, then the motion vector is forced to zero for the relevant macroblock.

Of course, this is merely an example, the marking consisting, in a more general manner, in performing a transcoding of the luminance values of the macroblocks by decrementing the values corresponding to the maximum coding value and then by forcing the luminance values of the macroblocks belonging to the exclusion zone to this maximum value.

The examples given describe an intra-mode coding of the macroblocks of the image belonging to the exclusion zone. The invention is not limited to this particular embodiment. It is entirely conceivable to code these macroblocks in inter mode together with null motion vectors or even in motion-compensated inter mode by taking account, for the calculation of the motion vectors from the reference image, of none but the blocks belonging to the exclusion zone of the reference image. In this case, the circuit for calculating the motion vectors, for a block of the exclusion zone, will have access to a memory which has stored the blocks of the reconstructed exclusion zone. The aim is to code the macroblocks belonging to the exclusion zone of the image in such as to be independent of the remainder of the image.

The definition of exclusion zone can be extended to any form provided that a specific processing element is capable of managing it. The latter may very well be situated outside or inside the motion estimator.

The applications relate to the coding of images which is compatible with the inserting of logos or other imagettes specific to the utilizer. They also relate to the real-time coding of images comprising insets.

What is claimed is:

1. Process for coding images according to the MPEG standard, for the insetting of at least one imagette into an image, utilizing the inter mode with motion estimation with respect to a reference image and the intra mode, wherein an exclusion zone which includes the macroblocks which lie even partially in the location of the imagette is defined in the reference image, the motion estimation of the macroblocks of the image not belonging to the exclusion zone does not take account of an image block belonging to the exclusion zone in the reference image, marking of the macroblocks of the reference image belonging to the exclusion zone being implemented through luminance values of these macroblocks in order to perform said motion estimation, macroblocks belonging to the exclusion zone of the image are replaced by macroblocks making up the imagette.

2. Process according to claim 1, wherein the inter mode for the coding of the macroblocks of the image belonging to an exclusion zone is an inter mode with null motion vectors.

3. Process according to claim 1, wherein the intra mode is forced for the coding of the macroblocks of the image belonging to an exclusion zone.

4. Process according to claim 1, wherein the marking consists in performing a transcoding of the luminance values of the macroblocks by decrementing the values equal to the maximum coding value and then by forcing the luminance values of the macroblocks belonging to the exclusion zone to this maximum value.

5. Process according to claim 1, wherein, for a given row of macroblocks, the coding allocates a specific slice for the macroblocks belonging to an exclusion zone.

6. Process for inserting an imagette into an image coded according to the process of claim 3, wherein the macroblocks of an intra-coded slice are replaced by macroblocks relating to the imagette.

7. Process according to claim 6, wherein the replacement consists of a recovery of the intra-coded macroblocks corresponding to the exclusion zones, a baseband decoding of these macroblocks, a mixing with the imagette to be inset into the exclusion zone, a coding of the image obtained so as to provide the replacement macroblocks.

8. Process according to claim 7, wherein the coding adapts the quantization interval for the macroblocks belonging to the exclusion zone as a function of the cost of coding the macroblocks to be inserted.

9. Device for coding digital video data according to the MPEG standard for the insetting of at least one imagette into an image, comprising a memory to store a reconstructed image and a motion estimation circuit to calculate motion vectors by comparing a source image to the reconstructed image, the memory is coupled to the motion estimation circuit through a transcoding and marking circuit for transcoding the luminance of the reconstructed image and marking macroblocks belonging to an exclusion zone which includes the macroblocks lying, even partially, in the location of the imagette, through luminance values of these macroblocks, in order to calculate the motion vectors while eliminating the motion vectors pointing from the macroblocks of the reconstructed image belonging to the exclusion zone.

* * * * *